(12) United States Patent
Turner et al.

(10) Patent No.: US 10,255,181 B2
(45) Date of Patent: Apr. 9, 2019

(54) DYNAMIC INPUT/OUTPUT COHERENCY

(71) Applicant: QUALCOMM Incorporated, San Diego, CA (US)

(72) Inventors: Andrew Edmund Turner, San Diego, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 15/268,768

(22) Filed: Sep. 19, 2016

(65) Prior Publication Data
US 2018/0081804 A1 Mar. 22, 2018

(51) Int. Cl.
| | |
|---|---|
| G06F 9/45 | (2006.01) |
| G06F 12/08 | (2016.01) |
| G06F 12/0808 | (2016.01) |
| G06F 12/0815 | (2016.01) |
| G06F 12/0831 | (2016.01) |
| G06F 12/0877 | (2016.01) |
| G06F 12/128 | (2016.01) |
| G06F 12/0804 | (2016.01) |
| G06F 12/084 | (2016.01) |
| G06F 9/50 | (2006.01) |
| G06F 12/12 | (2016.01) |

(52) U.S. Cl.
CPC ......... *G06F 12/0808* (2013.01); *G06F 9/505* (2013.01); *G06F 9/5083* (2013.01); *G06F 12/084* (2013.01); *G06F 12/0804* (2013.01); *G06F 12/0815* (2013.01); *G06F 12/0831* (2013.01); *G06F 12/0877* (2013.01); *G06F 12/128* (2013.01); *G06F 12/12* (2013.01); *G06F 2209/509* (2013.01); *G06F 2212/1041* (2013.01); *G06F 2212/621* (2013.01)

(58) Field of Classification Search
CPC ............... G06F 1/206; G06F 17/30067; G06F 11/1076; G06F 9/5083
USPC ........................................................ 711/130
See application file for complete search history.

(56) References Cited

U.S. PATENT DOCUMENTS

| | | | |
|---|---|---|---|
| 7,509,476 B2 | 3/2009 | Hass et al. | |
| 7,941,603 B2 | 5/2011 | Hass | |
| 8,218,538 B1 | 7/2012 | Chidambaram, et al. | |

(Continued)

FOREIGN PATENT DOCUMENTS

WO 2016139444 A1 9/2016

OTHER PUBLICATIONS

International Search Report and Written Opinion—PCT/US2017/047975—ISA/EPO—dated Nov. 14, 2014.

*Primary Examiner* — Mohamed M Gebril
(74) *Attorney, Agent, or Firm* — The Marbury Law Group/Qualcomm

(57) ABSTRACT

Aspects include computing devices, apparatus, and methods implemented by the apparatus for implementing dynamic input/output (I/O) coherent workload processing on a computing device. Aspect methods may include offloading, by a processing device, a workload to a hardware accelerator for execution using an I/O coherent mode, detecting a dynamic trigger for switching from the I/O coherent mode to a non-I/O coherent mode while the workload is executed by the hardware accelerator, and switching from the I/O coherent mode to a non-I/O coherent mode while the workload is executed by the hardware accelerator.

26 Claims, 9 Drawing Sheets

(56) References Cited

U.S. PATENT DOCUMENTS

| | | | |
|---|---|---|---|
| 2004/0117561 A1* | 6/2004 | Quach | G06F 12/082 |
| | | | 711/146 |
| 2004/0268044 A1 | 12/2004 | Heller et al. | |
| 2005/0055502 A1 | 3/2005 | Hass et al. | |
| 2009/0193197 A1 | 7/2009 | Stevens et al. | |
| 2009/0271583 A1* | 10/2009 | Kershaw | G06F 12/1491 |
| | | | 711/163 |
| 2010/0113120 A1* | 5/2010 | Snow | G07F 17/32 |
| | | | 463/16 |
| 2011/0023040 A1 | 1/2011 | Hendry et al. | |
| 2012/0317362 A1 | 12/2012 | Hendry et al. | |
| 2014/0040552 A1* | 2/2014 | Rychlik | G06F 12/0815 |
| | | | 711/122 |
| 2014/0095801 A1 | 4/2014 | Bodas et al. | |
| 2015/0378899 A1* | 12/2015 | Busaba | G06F 12/0808 |
| | | | 711/130 |

\* cited by examiner

DYNAMIC INPUT/OUTPUT COHERENCY

BACKGROUND

Hardware accelerators can be used to help a central processing unit (CPU) process workloads. The workloads often require using data from a CPU cache. To provide the accelerators with the data from the CPU cache, cache maintenance operations need to be implemented. However, cache maintenance operations can have negative impacts on the performance of processing a workload offloaded to an accelerator. Manual cache maintenance operation execution generally takes too long for offloading work to accelerators. A cache flush maintenance operation must be implemented before an accelerator run and cache invalidate maintenance operation must be implemented after the accelerator run. Small workload offloads to accelerators is increasingly important for improving processing performance. These small workload offloads can suffer the most performance degradation from cache maintenance penalties.

Input/output (I/O) coherency can be used to offload work to accelerators without having to implement costly cache maintenance procedures. However, an I/O coherent path for offloading workloads introduces overhead because of lower performance signal transmission (e.g., lower bandwidth). The I/O coherency penalty can negatively affect offloaded workload processing due to various factors of the I/O coherent path.

SUMMARY

Various aspects may include apparatuses and methods for implementing dynamic input/output (I/O) coherent workload processing on a computing device. Various aspects may include a processing device offloading a workload to a hardware accelerator for execution using an I/O coherent mode, detecting a dynamic trigger for switching from the I/O coherent mode to a non-I/O coherent mode while the workload is executed by the hardware accelerator, and switching from the I/O coherent mode to the non-I/O coherent mode while the workload is executed by the hardware accelerator in response to detecting the dynamic trigger.

Some aspects may further include determining whether execution of the workload by the hardware accelerator is completed, in which detecting a dynamic trigger for switching from the I/O coherent mode to a non-I/O coherent mode while the workload is executed by the hardware accelerator may include detecting the dynamic trigger for switching from the I/O coherent mode to the non-I/O coherent mode in response to determining that execution of the workload by the hardware accelerator is not completed.

Some aspects may further include executing a cache flush maintenance operation for a cache of the processing device while the workload is executed by the hardware accelerator in response to detecting the dynamic trigger for switching from the I/O coherent mode to the non-I/O coherent mode, receiving, from the hardware accelerator, a result of the offloaded workload by a shared memory in the I/O coherent mode, determining whether execution of the workload by the hardware accelerator is completed, and receiving the result of the offloaded workload without implementing a cache invalidate maintenance operation for the cache of the processing device in response to determining that execution of the workload by the hardware accelerator is completed.

Some aspects may further include determining whether execution of the workload by the hardware accelerator is completed, in which switching from the I/O coherent mode to a non-I/O coherent mode while the workload is executed by the hardware accelerator may include switching from the I/O coherent mode to the non-I/O coherent mode in response to determining that execution of the workload by the hardware accelerator is not completed, receiving, from the hardware accelerator, a result of the offloaded workload by a shared memory in the non-I/O coherent mode, executing a cache invalidate maintenance operation for the cache of the processing device in response to determining that execution of the workload by the hardware accelerator is completed, and receiving the result of the offloaded workload. Such aspects may further include executing a remaining portion of the offloaded workload by the hardware accelerator in response to determining that execution of the workload by the hardware accelerator is not completed.

In some aspects, detecting a dynamic trigger for switching from the I/O coherent mode to a non-I/O coherent mode may include at least one of detecting an elapsed time, detecting the processing device in an idle state, and detecting suffering of the execution of the offloaded workload. In some aspects, detecting suffering of the execution of the offloaded workload may include at least one of receiving a notification of a driver of performance from an augmented workload, using static assignment or method based on workload classification, polling hardware performance registers for data that indicates suffering, measuring interconnect operating levels near maximum, measuring accelerator memory latency, measuring accelerator memory backpressure, and detecting a hardware accelerator idle state.

Further aspects include a computing device having a memory, a hardware accelerator and a processor configured to perform operations of the methods summarized above. Further aspects include a computing device having means for performing functions of the methods summarized above. Further aspects include non-transitory processor-readable storage medium having stored thereon processor-executable instructions configure to cause a processing device of a computing device to perform operations of the methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

DETAILED DESCRIPTION

Figure 1:
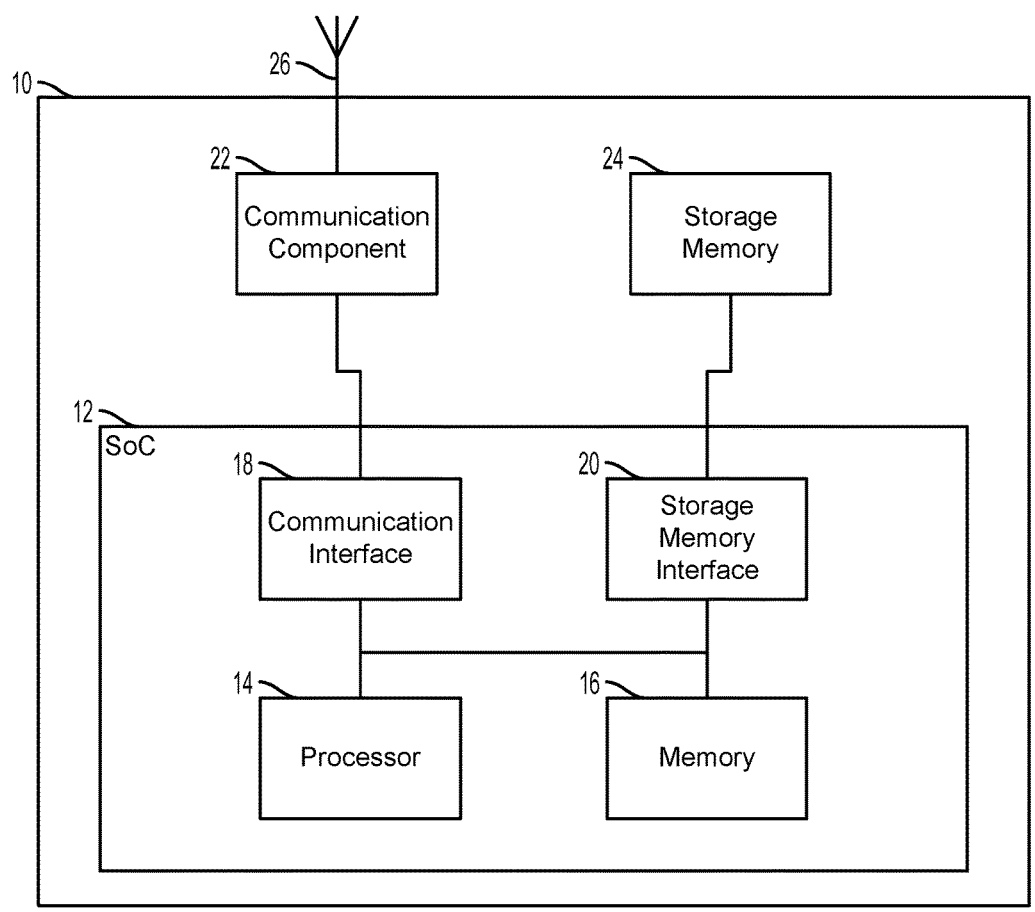
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects may include methods, and systems, and devices implementing such methods for implementing dynamic switching between input/output (I/O) coherent and non-I/O coherent modes to reduce the overhead penalty for offloading workloads for execution by hardware accelerators. The multiple processors may be multicore processors. The apparatus and methods of the various aspects may include offloading a workload to an accelerator in an I/O coherent mode, detecting a condition of a long workload, implementing cache maintenance operations, and switching to a non-I/O coherent mode.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Dynamic I/O coherency may allow for avoidance or deferment of cache maintenance operations for offloading workloads to accelerators. Avoidance or deferment of these cache maintenance operations may reduce the overhead associated with offloading workloads in I/O coherent and non-I/O coherent modes. An offloaded workload may be launched on an accelerator to help process a workload of a processing device, such as a central processing unit (CPU). The processing device may offload some of its workload to the accelerator for processing. The accelerator may be more efficient and/or faster than the processing device at executing the offloaded workload. The accelerator may be able to execute the offloaded workload in parallel with execution of the remainder of the workload by the processing device. The cache for the processing device and/or a shared memory communicatively connected to a coherent interconnect may be set initially to an I/O coherent mode. In the I/O coherent mode, the coherency mechanisms may be continuously implemented to ensure the correctness of the data in the processing device cache and/or the shared memory. Because of these coherency mechanisms, the cache maintenance operations may not be needed to ensure the correctness of the data in the processing device cache and/or the shared memory. However, the I/O coherent mode may introduce an overhead penalty that may be affected by variables of the I/O coherent path. For example, the I/O coherent mode overhead penalty may grow with the workload.

If the offloaded workload finishes before detecting that the workload is suffering from a growing overhead penalty of the I/O coherent mode, then I/O coherent mode overhead penalty may be kept low and no cache maintenance operation overhead may be incurred. Certain conditions may be used to determine when the workload is growing to a magnitude at which the I/O coherent mode overhead penalty may be exceeding acceptable limits. Such conditions may include a calculated or preset elapsed time, the CPU being in an idle state, and/or the workload exhibiting signs of suffering from using the I/O coherent path. Detection of workload suffering may be based on a variety of metrics. Augmented workloads may notify a driver of performance. The use of static assignment or a method based on workload classification, either via testing or random testing, may lead to standard time-outs or signals that indicate workload suffering. Polling hardware performance registers may provide data that indicates workload suffering. Persistently high interconnect operating levels near maximum, such as bandwidth and/or outstanding transactions, may indicate throttling. High accelerator memory latency may indicate latency limitations. High accelerator memory backpressure may indicate bandwidth throttling. High accelerator idle due to memory in conjunction with high occupancy memory request queues may indicate that bandwidth is limited.

If a processor or hardware detects that the offloaded workload may be suffering from a growing overhead penalty of the I/O coherent mode, the processing device cache and/or the shared memory may dynamically change from I/O coherent mode to non-I/O coherent mode. Before dynamically switching to the non-I/O coherent mode, and while still in the I/O coherent mode, cache flush maintenance operations may be implemented for the processing device cache. Implementing the cache flush operations while still in the I/O coherent mode may allow the accelerator to continue executing the offloaded workload without incurring the non-I/O coherent overhead penalty for the cache flush maintenance operation. The processing device cache and/or the shared memory may be dynamically switched from the I/O coherent mode to the non-I/O coherent mode after the cache flush operations.

Suffering detection and cache maintenance operation management may be implemented in software configured to cause a processing device to poll the accelerators for performance information, and to trigger the cache maintenance operations and dynamically switch the I/O coherency mode of the processing device cache. Hardware may be used to detect suffering and to notify the software to trigger the cache maintenance operations and dynamically switch the I/O coherency mode of the processing device cache and/or the shared memory. Hardware may be used to detect suffering and to trigger the cache maintenance operations and dynamically switch the I/O coherency mode of the processing device cache and/or the shared memory.

In the non-I/O coherency mode for the processing device cache and/or the shared memory, the accelerator may continue to execute the remainder of the offloaded workload. After finishing execution of the offloaded workload, the cache invalidate maintenance operations may be implemented. Since the cache invalidate maintenance operations may be the only cache maintenance operation implemented during the non-I/O coherent offloaded workload execution, the offloaded workload execution may only incur the non-I/O coherent overhead penalty for the cache invalidate maintenance operations.

For the entire offloaded workload execution by the accelerator, the I/O coherent overhead penalty may be kept to a lower amount than executing the entire offloaded workload using I/O coherent mode by minimizing the duration of execution using I/O coherent mode when suffering is detected. The non-I/O coherent overhead penalty may be kept to a lower amount than executing the entire offloaded workload using non-I/O coherent mode by executing the cache flush maintenance operations in parallel with the offloaded workload execution while still in I/O coherent mode.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various aspects. The computing device 10 may not be limited to one of each of the components, and multiple instances of each component may be included in various configurations of the computing device 10.

Figure 2:
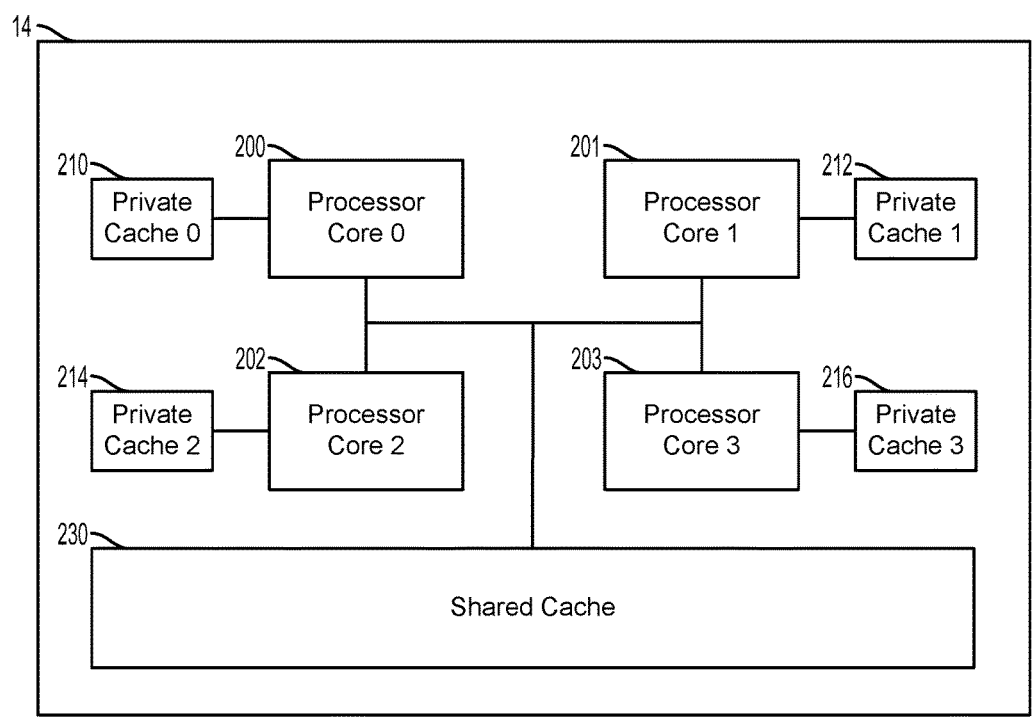
FIG. 2 is a component block diagram illustrating an example multicore processor suitable for implementing an aspect.

FIG. 2 illustrates a multicore processor suitable for implementing an aspect. The multicore processor 14 may include multiple processor types, including, for example, a central processing unit, a graphics processing unit, and/or a digital processing unit. The multicore processor 14 may also include a custom hardware accelerator, which may include custom processing hardware and/or general purpose hardware configured to implement a specialized set of functions.

The multicore processor may have a plurality of homogeneous or heterogeneous processor cores 200, 201, 202, 203. A homogeneous multicore processor may include a plurality of homogeneous processor cores. The processor cores 200, 201, 202, 203 may be homogeneous in that, the processor cores 200, 201, 202, 203 of the multicore processor 14 may be configured for the same purpose and have the same or similar performance characteristics. For example, the multicore processor 14 may be a general purpose processor, and the processor cores 200, 201, 202, 203 may be homogeneous general purpose processor cores. The multicore processor 14 may be a graphics processing unit or a digital signal processor, and the processor cores 200, 201, 202, 203 may be homogeneous graphics processor cores or digital signal processor cores, respectively. The multicore processor 14 may be a custom hardware accelerator with homogeneous processor cores 200, 201, 202, 203. For ease of reference, the terms "custom hardware accelerator," "processor," and "processor core" may be used interchangeably herein.

A heterogeneous multicore processor may include a plurality of heterogeneous processor cores. The processor cores 200, 201, 202, 203 may be heterogeneous in that the processor cores 200, 201, 202, 203 of the multicore processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous multicore processors 14. In various aspects, not all off the processor cores 200, 201, 202, 203 need to be heterogeneous processor cores, as a heterogeneous multicore processor may include any combination of processor cores 200, 201, 202, 203 including at least one heterogeneous processor core.

Each of the processor cores 200, 201, 202, 203 of a multicore processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The multicore processor 14 may further include a shared cache 230 that may be configured to for read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the multicore processor 14. The shared cache 230 may include volatile memory as described herein with reference to memory 16 of FIG. 1.

In the example illustrated in FIG. 2, the multicore processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various aspects to a four-core processor system with four designated private caches. The computing device 10, the SoC 12, or the multicore processor 14 may individually or in combination include fewer or more than the four processor cores 200, 201, 202, 203 and private caches 210, 212, 214, 216 illustrated and described herein.

Figure 3:
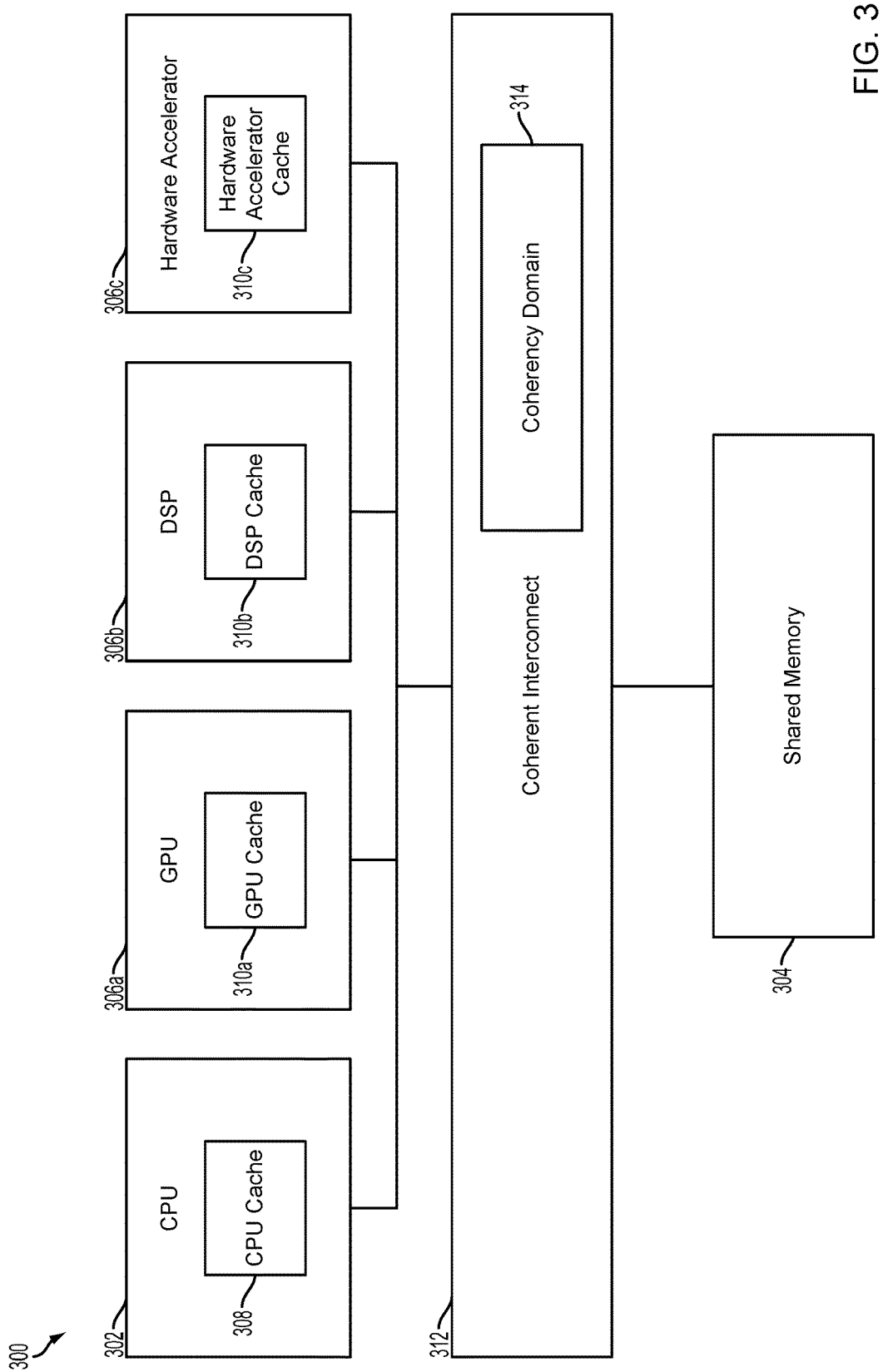
FIG. 3 is a block diagram illustrating an example heterogeneous computing device having a coherent interconnect suitable for implementing an aspect.

FIG. 3 illustrates an example aspect of a heterogeneous computing device having a coherent interconnect. A heterogeneous computing device (e.g., the computing device 10 in FIG. 1) configured to implement a dynamic I/O coherency system may include at least two, but up to any integer number "N" processing devices (e.g., processor 14 in FIGS. 1 and 2); for example, processing device (e.g., CPU) 302, hardware accelerator (e.g., GPU) 306a, hardware accelerator (e.g., DSP) 306b, and/or custom hardware accelerator 306c. Each processing device 302, 306a, 306b, 306c may be associated with a processing device cache (e.g., private caches 210, 212, 214, 216, and/or shared cache 230 in FIG. 2). For example, the processing device 302 may include a processing device cache (e.g., CPU cache) 308, the hardware accelerator 306a may include a hardware accelerator cache (e.g., GPU cache) 310a, the hardware accelerator 306b may include a hardware accelerator cache (e.g., DSP cache) 310b, and/or the custom hardware accelerator 306c may include a custom hardware accelerator cache 310c. As discussed herein, each of the processing devices 302, 306a, 306b, 306c may be homogenous and/or heterogeneous with respect to each other and/or among their respective processor cores (e.g., processor cores 200, 201, 202, 203 in FIG. 2).

A coherent interconnect 312 may be communicatively connected to the processing devices 302, 306a, 306b, 306c, and any number of main memory or random access memory components, such as shared memory 304 (e.g., memory 16, 24 in FIG. 1). The coherent interconnect 312 may be configured to enable and control transmission of data between the various connected components. For a processing device cache 308, 310a, 310b, 310c and/or the shared memory 304 operating in an I/O coherent mode, the coherency mechanisms may be continuously implemented by the coherent interconnect 312 to ensure the correctness of the data in the processing device cache 308, 310a, 310b, 310c and/or the shared memory 304. The coherent interconnect 312 may be configured to transmit data between the processing devices 302, 306a, 306b, 306c so that the processing devices 302, 306a, 306b, 306c may share processing of a workload and output the results of the workload processing. For the results to be correct, the data input to and output from the processing devices 302, 306a, 306b, 306c may be subject to coherency requirements that may be implemented by the coherency mechanisms of the coherent interconnect 312 while the I/O coherent mode is active. In various aspects, a coherency domain 314 or other coherency mechanisms of the coherent interconnect 312, such as a snoop filter (not shown), may be configured to perform coherency checks and invalidations based on receipt of memory access requests to the processing device cache 308, 310a, 310b, 310c and/or the shared memory 304. The coherency domain 314 may also be configured to clear transactions based on receipt of acknowledgements of the transactions between the processing devices 302, 306a, 306b, 306c and/or the shared memory 304.

While the I/O coherent mode is inactive, or the processing device cache 308, 310a, 310b, 310c and/or the shared memory 304 is in a non-I/O coherent mode, correctness of the data input to and output from the processing devices 302, 306a, 306b, 306c may be managed by the processing devices 302, 306a, 306b, 306c themselves. In various aspects, cache maintenance operations may be implemented by the processing devices 302, 306a, 306b, 306c for the data stored in the processing device cache 308, 310a, 310b, 310c. In various aspects, components of the processing devices 302, 306a, 306b, 306c, including cache management devices (not shown) and/or the processor cores, may be configured to implement the cache maintenance operations. The coherent interconnect 312 may still transmit data between the data between the processing devices 302, 306a, 306b and/or the shared memory 304 without conducting coherency operations.

FIG. 3 illustrates non-limiting examples of a heterogeneous computing device configured to implement a dynamic I/O coherency system. The examples illustrated and described herein, particularly with reference to those of and relating to FIG. 3, are non-limiting. The heterogeneous computing device configured to implement a dynamic I/O coherency system may include any number and/or combination of processing devices, processor cores, processing device caches (e.g., private caches and/or shared caches), coherent interconnects, shared memories, and connections between such components.

FIGS. 4-7 illustrate example aspects of workload offloading. These examples illustrate workload offloading from a processing device (e.g., CPU) 302 to a hardware accelerator (e.g., GPU, DSP, custom hardware accelerator, etc.) 306. These examples illustrate workload offloading between the processing device 302 and a single hardware accelerator 306. In various aspects, data transmitted between the processing device 302 and the hardware accelerator 306 may be transmitted through reads/writes to a shared memory (e.g., shared memory 304 in FIG. 3), and can be triggered via a cache miss mechanism. In various aspects, data transmission, including via the shared memory, may occur throughout execution of the offloaded workload. These examples of one to one workload offloading are nonlimiting, and the processing device 302 may offload portions of the workload to any number of hardware accelerators 306 and/or other processing devices 302, including via any number of shared memories.

In each of the examples illustrated in FIGS. 4-7, the processing device 302 may be tasked with executing a workload. The processing device 302 may be configured to offload portions of the workload to the hardware accelerator 306. The data for the offloaded workload may be stored in the processing device cache (e.g., processing device cache 308 in FIG. 6). The data may be transmitted via the coherent interconnect (e.g., coherent interconnect 312 in FIG. 3) to the hardware accelerator 306. In various aspects, the data may be transmitted through the shared memory communicatively connect or integral to the coherent interconnect. The hardware accelerator 306 may execute the offloaded workload using the transmitted data, and transmit the results back to the processing device 302 to be written to the processing device cache.

Figure 4:
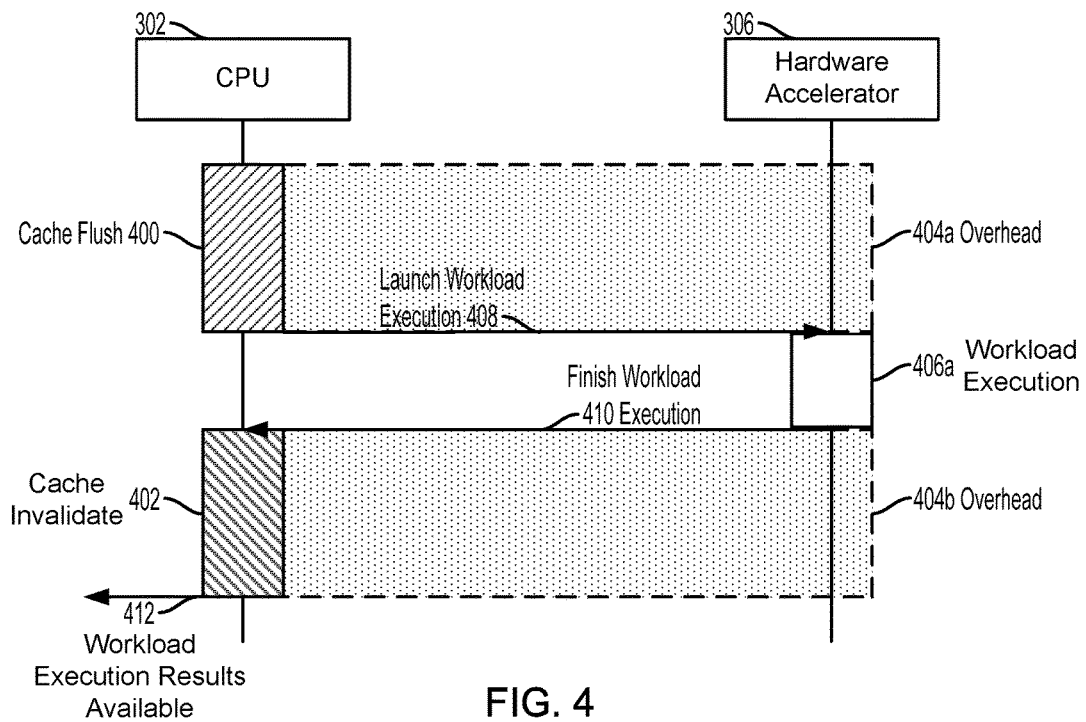
FIG. 4 is a signal and process diagram illustrating an example of non-I/O coherent workload processing for implementing an aspect.

FIG. 4 illustrates an example aspect of non-I/O coherent workload processing. To transmit the data for the offloaded workload to the hardware accelerator 306, and to output the results received from the hardware accelerator 306, the processing device 302 may implement cache maintenance operations to write the data to either the shared memory and then to the hardware accelerator 306 or directly to the hardware accelerator 306 via the coherent interconnect. As noted herein, during non-I/O coherent data transmissions, the coherent interconnect may transmit data between the data between the processing device 302 and the shared memory and/or the hardware accelerator 306 without conducting coherency operations.

To transmit the data for the offloaded workload to the hardware accelerator 306, the processing device 302 may implement a cache flush maintenance operation 400 to write the data to the shared memory and/or to the hardware accelerator 306 via the coherent interconnect. The cache flush maintenance operation 400 writing the data to multiple destination creates an overhead 404a, which may vary depending on the amount of data in the processing device cache that is written out for the offloaded workload. The data stored in the processing device cache may be stored in partitions or buffers, and the cache flush maintenance operation 400 may be implemented for such specific portions of the processing device cache. Otherwise, the cache flush maintenance operation 400 may be implemented for the whole processing device cache. The overhead 404a may delay the commencement of the offloaded workload execution by the hardware accelerator 306.

During a time correlating to the overhead 404a of the cache flush maintenance operation 400, the processing device 302 may complete offloading a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIG. 3). The hardware accelerator 306 may launch execution of the offloaded workload 408, and execute the offloaded workload 406a. The length of time spent executing the offloaded workload may depend on various factors, including size and/or complexity of the offloaded workload, resource use and/or availability of and/or for the hardware accelerator 306 including electrical power, computing power, memory space, communication bandwidth, and/or environmental factors including temperature. The hardware accelerator 306 may finish the offloaded workload execution 410, returning the results of the offloaded workload execution 406a to the processing device 302 via the coherent interconnect.

To make the results of the offloaded workload execution available to the processing device 302, the processing device 302 may implement a cache invalidate maintenance operation 402 to direct future reads of the processing device cache space to the shared memory currently storing the results as a miss after the results are output by the hardware accelerator 306. The cache invalidate maintenance operation 402 may also create an overhead 404b, which may vary depending on the amount of data of the stored offloaded workload results or the space used in the in the processing device cache to store the offloaded workload results. The overhead 404b may delay the availability of the offloaded workload results for access by the processing device 302. Upon completion of the cache invalidate maintenance operation 402, the offloaded workload results may become available 412 for access, use, and/or output of the offloaded workload results by the processing device 302. The processing device 302 may receive the results of the offloaded workload execution 406a and store the results in its processing device cache.

Figure 5:
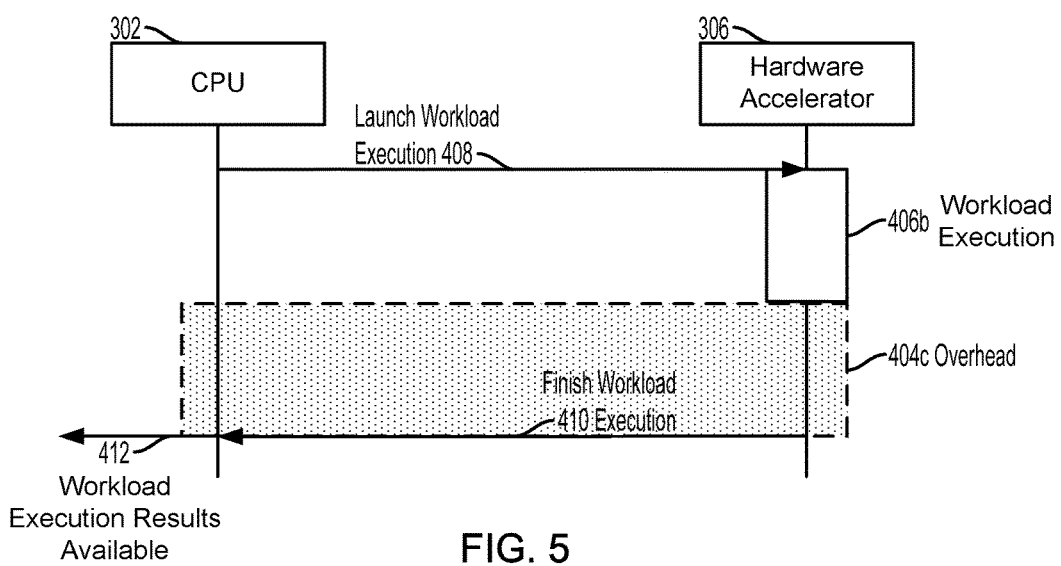
FIG. 5 is a signal and process diagram illustrating an example of I/O coherent workload processing for implementing an aspect.

FIG. 5 illustrates an example aspect of I/O coherent workload processing. To transmit the data for the offloaded workload to the hardware accelerator 306, and to output the results received from the hardware accelerator 306, coherency mechanisms (e.g., the coherency domain 314 in FIG. 3 and/or a snoop filter) may be continuously implemented by the coherent interconnect 312 to ensure the correctness of the data in the processing device cache and/or the shared memory. Thus, while the processing device cache and/or the shared memory are in an I/O coherent mode, the processing device 302 may not implement the cache maintenance operations that it may implement for a non-I/O coherent mode.

The processing device 302 may offload a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIG. 3). The hardware accelerator 306 may launch execution of the offloaded workload 408, and execute the offloaded workload 406b. Rather than incurring overhead for transmitting the offloaded workload data as for a processing device cache and/or the shared memory in the non-I/O coherent mode, in the I/O coherent mode the coherency may be maintained while the data is transferred so that no overhead is incurred before the launch execution of the offloaded workload 408.

An increase in overhead 404c may still be incurred during execution of the offloaded workload 406b. This overhead 404c may be caused by the performance of the coherent path the data of the offloaded workload result travels. The coherent interconnect may not be able to implement its coherency mechanisms and transfer the offloaded workload result as quickly as the hardware accelerator 306 produces the offloaded workload result. The coherent interconnect may cause a bottleneck for the offloaded workload result while implementing the coherency mechanisms resulting in the added overhead 404c. In various aspects, the overhead 404c may be proportional or roughly proportional to the run time of the hardware accelerator 306 for executing the offloaded workload 406b.

Once the coherency mechanisms of the coherent interconnect complete their operations to ensure correctness of the offloaded workload result in the processing device cache and/or the shared memory, the offloaded workload result may become available 412 for access, use, and/or output of the offloaded workload result by the processing device 302.

Figure 6:
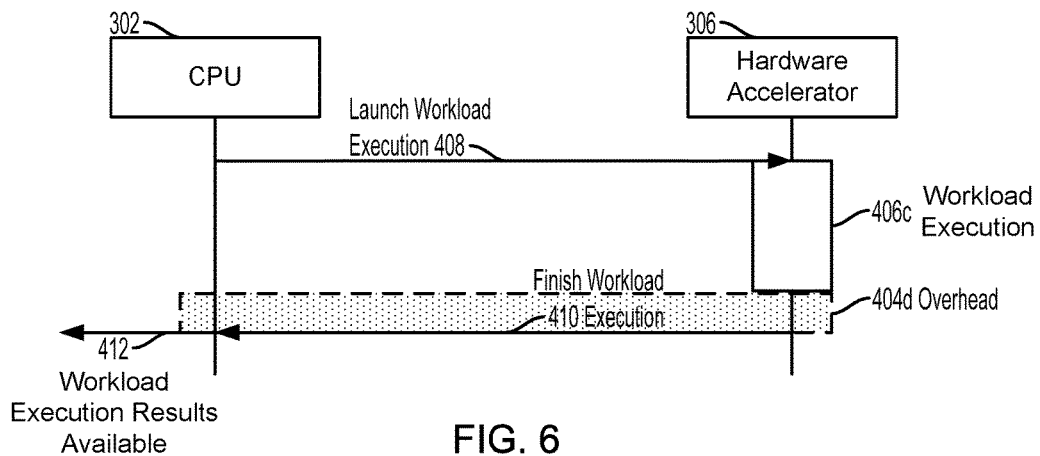
FIG. 6 is a signal and process diagram illustrating an example of dynamic I/O coherent workload processing for implementing an aspect.
Figure 7:
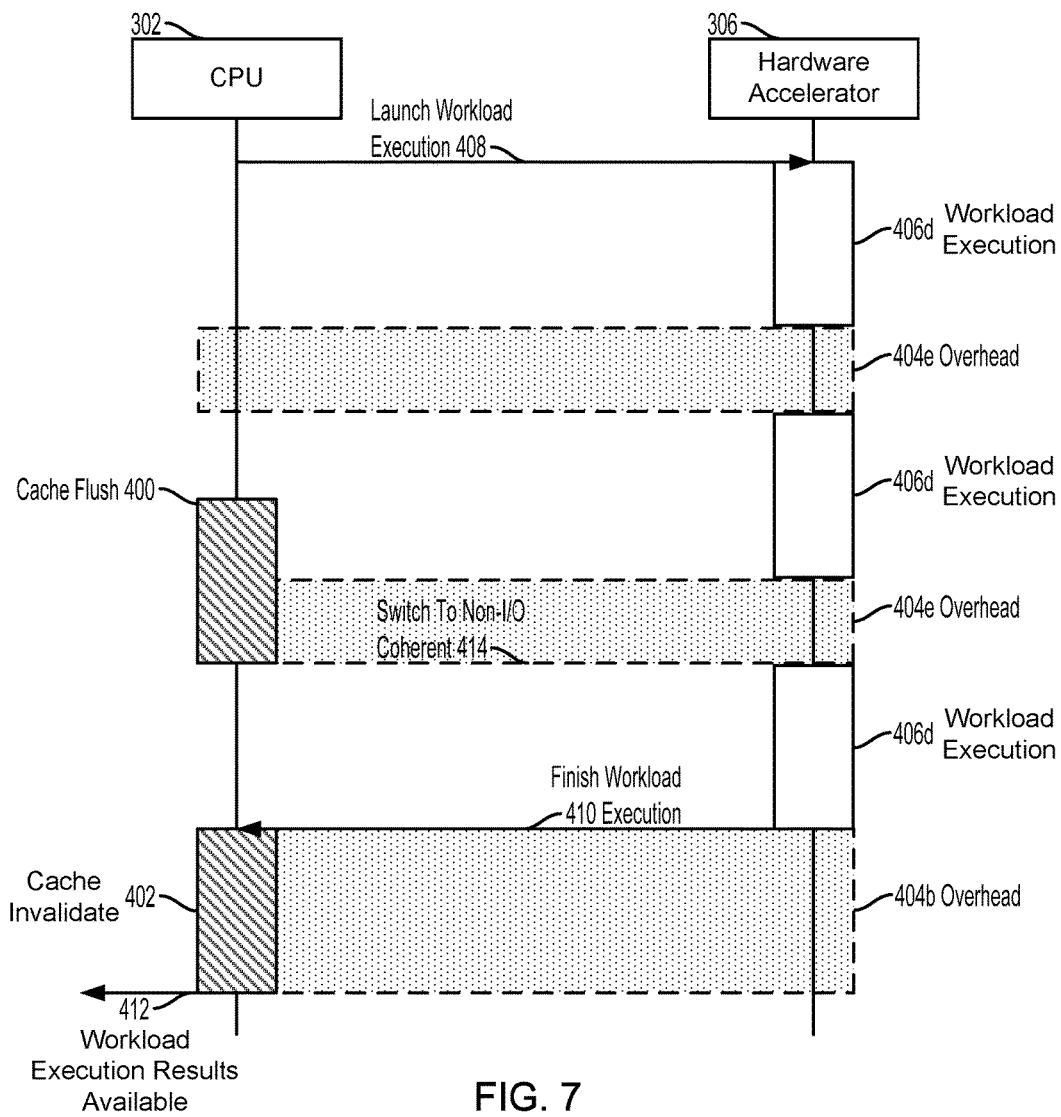
FIG. 7 is a signal and process diagram illustrating an example of dynamic I/O coherent workload processing for implementing an aspect.

FIGS. 6 and 7 illustrate example aspects of dynamic I/O coherent workload processing. In the examples illustrated in each of FIGS. 6 and 7, workload offloading by the processing device 302 may begin with the processing device cache and/or the shared memory in an I/O coherent mode. Thus, to transmit the data for the offloaded workload to the hardware accelerator 306, and to receive and/or output the results generated by the hardware accelerator 306, coherency mechanisms (e.g., the coherency domain 314 in FIG. 3 and/or a snoop filter) may be continuously implemented by the coherent interconnect 312 to ensure the correctness of the data in the processing device cache and/or the shared memory. Thus, while the processing device cache and/or the shared memory are in an I/O coherent mode, the processing device 302 may not implement the cache maintenance operations that it may implement for a non-I/O coherent mode.

The processing device 302 may offload a portion of the workload to the hardware accelerator 306. In various aspects, offloading a portion of the workload to the hardware accelerator 306 may include data reads and writes by the hardware accelerator 306 accessing the processing device cache and/or the shared memory. Access to the shared memory may be implemented via a cache miss mechanism for cache misses of the processing device cache. The hardware accelerator 306 may execute the offloaded workload using the data retrieved from the processing device cache and/or the shared memory without needing to cache the data locally. In various aspects, the hardware accelerator 306 may store any transmitted data for the offloaded workload to its hardware accelerator cache (e.g., processing device cache 310a, 310b, 310c in FIG. 3). The hardware accelerator 306 may launch execution of the offloaded workload 408 and execute the offloaded workload 406c, 406d. Rather than incurring overhead for transmitting the offloaded workload data as for a processing device cache and/or the shared memory in the non-I/O coherent mode, in the I/O coherent mode the coherency may be maintained while the data is transferred so that not overhead is incurred before the launch execution of the offloaded workload 408.

The example illustrated in FIG. 6 is an implementation of dynamic I/O coherent workload processing for a short run offloaded workload execution by the hardware accelerator 306. As described herein, an overhead 404d may still be incurred for execution of the offloaded workload 406c. In dynamic I/O coherent workload processing, as long as the overhead 404d remains below an overhead threshold, the execution of the offloaded workload 406c may continue with the processing device cache and/or the shared memory in an I/O coherent mode. Thus, the overhead 404d is limited to the overhead caused by the performance of the coherent interconnect transmitting the offloaded workload result as described herein. Once the coherency mechanisms of the coherent interconnect complete their operations to ensure correctness of the offloaded workload result in the processing device cache and/or the shared memory, the offloaded workload result may become available 412 for access, use, and/or output of the offloaded workload result by the processing device 302.

The example illustrated in FIG. 7 is an implementation of dynamic I/O coherent workload processing for a long run offloaded workload execution by the hardware accelerator 306. As described herein, an overhead 404e may still be incurred for execution of the offloaded workload 406c. In dynamic I/O coherent workload processing, a long run offloaded workload may produce an overhead 404e that exceeds an overhead threshold. Various methods may be used to detect a long run workload that exceeds the overhead threshold, including the processing device 302 entering an idle state, an elapsed time, and/or suffering of the execution of the offloaded workload, as described further herein.

In response to detecting a long run offloaded workload, the processing device 302 may dynamically transition the processing device cache and/or the shared memory from an I/O coherent mode to a non-I/O coherent mode. In order to transition from an I/O coherent mode to a non-I/O coherent mode, the processing device 302 may begin to implement cache maintenance operations while the processing device cache and/or the shared memory remains in an I/O coherent mode. For example, the processing device 302 may implement a cache flush maintenance operation 400 while the hardware accelerator continues the offloaded workload execution 404d. During the cache flush maintenance operation 400, the offloaded workload execution 404d may continue to incur the I/O coherent mode overhead 404e, but no overhead may be incurred for the cache flush maintenance operation 400. Thus, the overhead 404d may be limited to the overhead caused by the performance of the coherent interconnect transmitting the offloaded workload result as described herein.

Upon completion of the cache flush maintenance operation 400, the processing device cache and/or the shared memory may dynamically switch from an I/O coherent mode to a non-I/O coherent mode 414. The switch between an I/O coherent mode and a non-I/O coherent mode 414 may not interrupt the offloaded workload execution 404d. While the offloaded workload execution 404d continues, no more I/O coherent mode overhead 404e may be incurred. The hardware accelerator 306 may finish the offloaded workload execution 410, returning the results of the offloaded workload execution 406d to the processing device 302 via the coherent interconnect and/or the shared memory.

To make the results of the offloaded workload execution available to the processing device 302, the processing device 302 may implement a cache invalidate maintenance operation 402 as discussed further herein. The cache invalidate maintenance operation 402 may create an overhead 404b, which may vary depending on the amount of data of the stored offloaded workload results or the space used in the in the processing device cache to store the offloaded workload results. The overhead 404b may delay the availability of the offloaded workload results for access by the processing device 302. Upon completion of the cache invalidate maintenance operation 402, the offloaded workload results may become available 412 for access, use, and/or output of the offloaded workload results by the processing device 302. The processing device 302 may receive the results of the offloaded workload execution 406a and store the results in its processing device cache.

Figure 8:
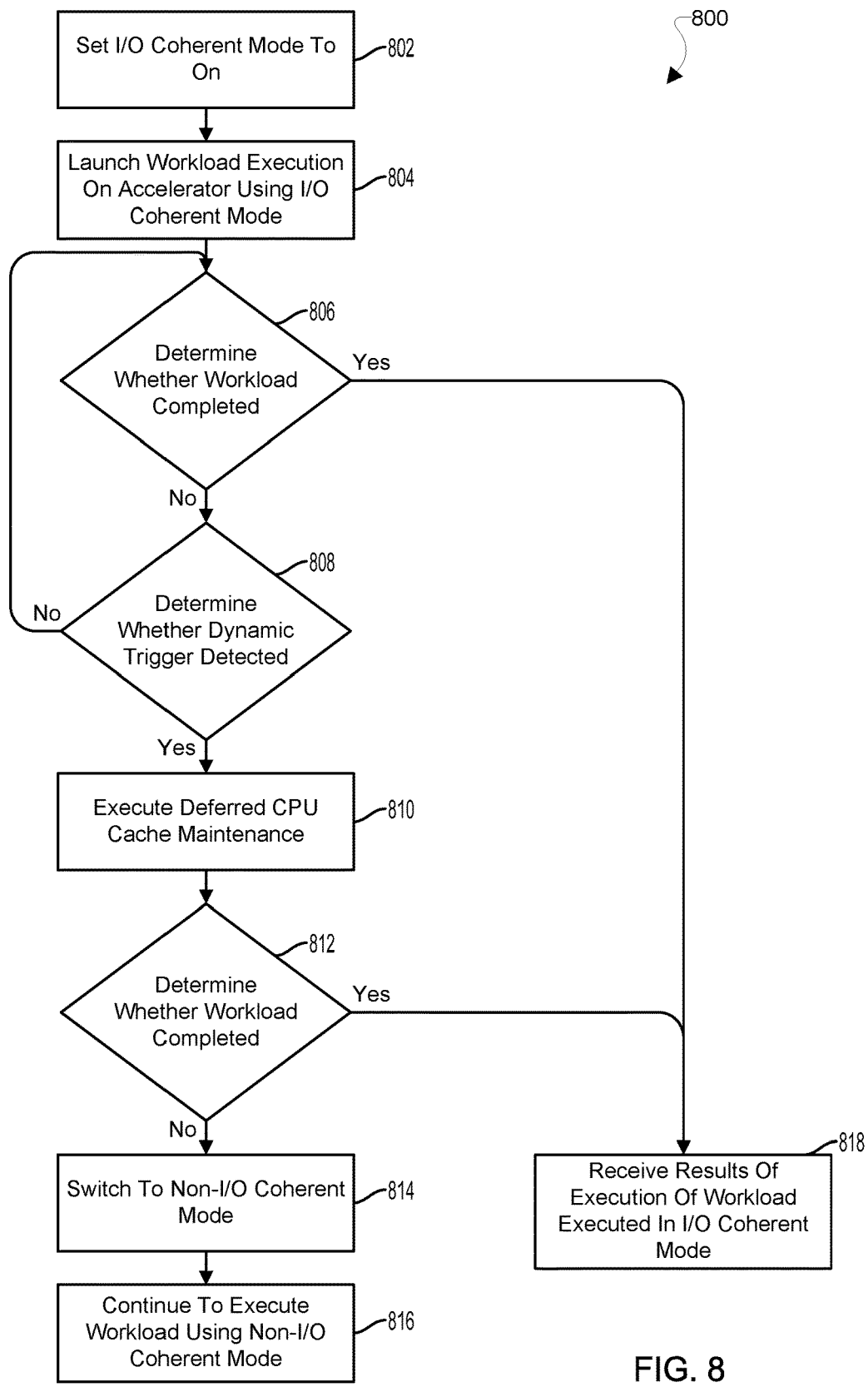
FIG. 8 is a process flow diagram illustrating a method for implementing dynamic I/O coherent workload processing according to an aspect.

FIG. 8 illustrates a method 800 for implementing dynamic I/O coherent workload processing according to an aspect. The method 800 may be implemented in a computing device in software executing in a processor (e.g., the processor 14 in FIGS. 1 and 2 and processing device 302 in FIGS. 3-7), in general purpose hardware, in dedicated hardware, or in a combination of a software-configured processor and dedicated hardware, such as a processor executing software within a dynamic I/O coherency system (e.g., FIG. 3) that includes other individual components. In order to encompass the alternative configurations enabled in the various aspects, the hardware implementing the method 800 is referred to herein as a "processing device."

In block 802, the processing device may set an I/O coherent mode to "on" for a processing device cache (e.g., processing device cache 308 in FIG. 3) and/or a shared memory (e.g., shared memory 304 in FIG. 3). Alternatively, the processing device may set a non-I/O coherent mode to "of" for the processing device cache and/or the shared memory. In various aspects, the I/O coherent mode may be set to "on" as a default state for the processing device cache and/or the shared memory, therefore setting the I/O coherent mode to "on" may be unnecessary. Setting the I/O coherent mode to "on" may be a precautionary measure even if "on" is the default I/O coherent mode state.

In block 804, the processing device may launch the offloaded workload execution on a hardware accelerator (e.g., GPU 306a, DSP 306b, custom hardware accelerator 306c in FIG. 3 and hardware accelerator 306 in FIGS. 4-7) using I/O coherent mode. As discussed herein, launching the execution may be immediate to the offloading of the workload to the hardware accelerator, as no overheard may be incurred for transmitting data from the processing device to the hardware accelerator when using I/O coherent mode. The memory access requests to transmit data between the processing device and the hardware accelerator may be routed through an I/O coherent path of the coherent interconnect (e.g., the coherent domain 314 in FIG. 3). The data transmitted between the processing device and the hardware accelerator may include data from the processing device to the hardware accelerator for executing the offloaded workload and data from the hardware accelerator to the processing device as results of the executed offloaded workload. Data transmitted between the processing device and the hardware accelerator may be transmitted through the shared memory.

In determination block 806, the processing device may determine whether the offloaded workload has been completed by the hardware accelerator.

In response to determining that the offloaded workload is completed by the hardware accelerator (i.e., determination block 806="Yes"), the processing device may receive results of the execution of the offloaded workload from the hardware accelerator in block 818. The results of the execution of the offloaded workload may be output by the hardware accelerator to the shared memory and retrieved from the shared memory by the processing device. Completion of execution of the offloaded workload entirely in I/O coherent mode may signify that cache maintenance operations are unnecessary as a result of the I/O coherent mechanisms of the coherent interconnect managing coherency of the data.

In response to determining that the offloaded workload is not completed by the hardware accelerator (i.e., determination block 806="No"), the processing device may determine whether a dynamic trigger for switching between I/O coherent mode and non-I/O coherent mode is detected in determination block 808. The dynamic trigger may be used to determine when the offloaded workload may be growing to the point that the I/O coherent mode overhead penalty may be undesirable or unacceptable. Determining whether the dynamic trigger is detected may be accomplished in any combination of various manners.

In some aspects, the dynamic trigger may include a preset or calculated time to elapse, and detecting the dynamic trigger may involve detecting that the time has elapsed. In various aspects, the time may be preset or calculated based on a expected amount of time for execution of the offloaded workload by the hardware accelerator. The expected execution time of the offloaded workload may be based on various factors, including size and/or complexity of the offloaded workload, resource use and/or availability of and/or for the hardware accelerator including electrical power, computing power, memory space, and/or communication bandwidth, and/or environmental factors including temperature. In various aspects, the time may be preset or calculated as a trivial value, such as zero (0), to trigger immediate switching between I/O coherent mode and non-I/O coherent mode.

In some aspects, the dynamic trigger may include sensing the processing device transitioning to and/or being in an idle state. The idle state may indicate that the hardware accelerator may be executing the offloaded workload slower than expected because the processing device has run out of work and is waiting for the hardware accelerator to finish the offloaded workload. The goal of offloading workloads is to efficiently use computing resources to execute the workloads. Thus, the processing device transitioning to and/or being in an idle state may indicate inefficient use of computing resources.

In some aspects, the dynamic trigger may include indicators of the execution of the offloaded workload suffering from using the I/O coherent path. Offloaded workload suffering may be detected based on a variety of metrics. Augmented workloads may notify a driver of performance. The use of static assignment or a method based on workload classification, either via testing or random testing, may lead to standard time-outs or signals that indicate workload suffering. Polling hardware performance registers may provide data that indicates workload suffering. Persistently high interconnect operating levels, such as bandwidth and/or outstanding transactions, near maximum may indicate throttling. High accelerator memory latency may indicate latency limitations. High accelerator memory backpressure may indicate bandwidth throttling. High accelerator idle due to memory in conjunction with high occupancy memory request queues may indicate that bandwidth is limited.

In response to determining that a dynamic trigger for switching between I/O coherent mode and non-I/O coherent mode is not detected (i.e., determination block 808="No"), the processing device may determine whether the offloaded workload is completed by the hardware accelerator in determination block 806.

In response to determining that a dynamic trigger for switching between I/O coherent mode and non-I/O coherent mode is detected (i.e., determination block 808="Yes"), the processing device may execute deferred processing device cache maintenance in block 810. As discussed herein, in preparation for switching from I/O coherent mode to non-I/O coherent mode, the processing device may execute a cache flush maintenance operation for the processing device cache. The hardware accelerator may continue to execute the offloaded workload while the processing device executes the cache flush maintenance operation in block 810.

In determination block 812, the processing device may determine whether the offloaded workload is completed by the hardware accelerator.

In response to determining that the offloaded workload is completed by the hardware accelerator (i.e., determination block 812="Yes"), the processing device may receive results of the execution of the offloaded workload received from the hardware accelerator in block 818. Completion of execution of the offloaded workload entirely in I/O coherent mode may signify that cache maintenance operations are unnecessary as a result of the I/O coherent mechanisms of the coherent interconnect managing coherency of the data. While the cache flush maintenance operation may already have executed, no additional overhead may be incurred by the execution of the cache flush maintenance operation, because of the cache flush maintenance operation's execution in parallel with the execution of the offloaded workload while in I/O coherent mode.

In response to determining that the offloaded workload is not completed by the hardware accelerator (i.e., determination block 812="No"), the processing device may switch the processing device cache and/or the shared memory from an I/O coherent mode to a non-I/O coherent mode in block 814. The switch from the I/O coherent mode to the non-I/O coherent mode in block 814 may include setting a state of the I/O coherent mode to "off" or setting a state of the non-I/O coherent mode to "on". The switching from the I/O coherent mode to the non-I/O coherent mode may change the routing of data and memory access requests through the coherent interconnect so that data and requests are no longer routed through the coherent domain and coherency operations are not longer implemented for the data and memory access requests. Rather, the processing device may begin to implement cache maintenance operations in response to the processing device cache and/or the shared memory being set to a non-I/O coherent mode.

In block 816, the hardware accelerator may continue execute the offloaded workload while the processing device cache and/or the shared memory is in a non-I/O coherent mode, as described further herein.

Figure 9:
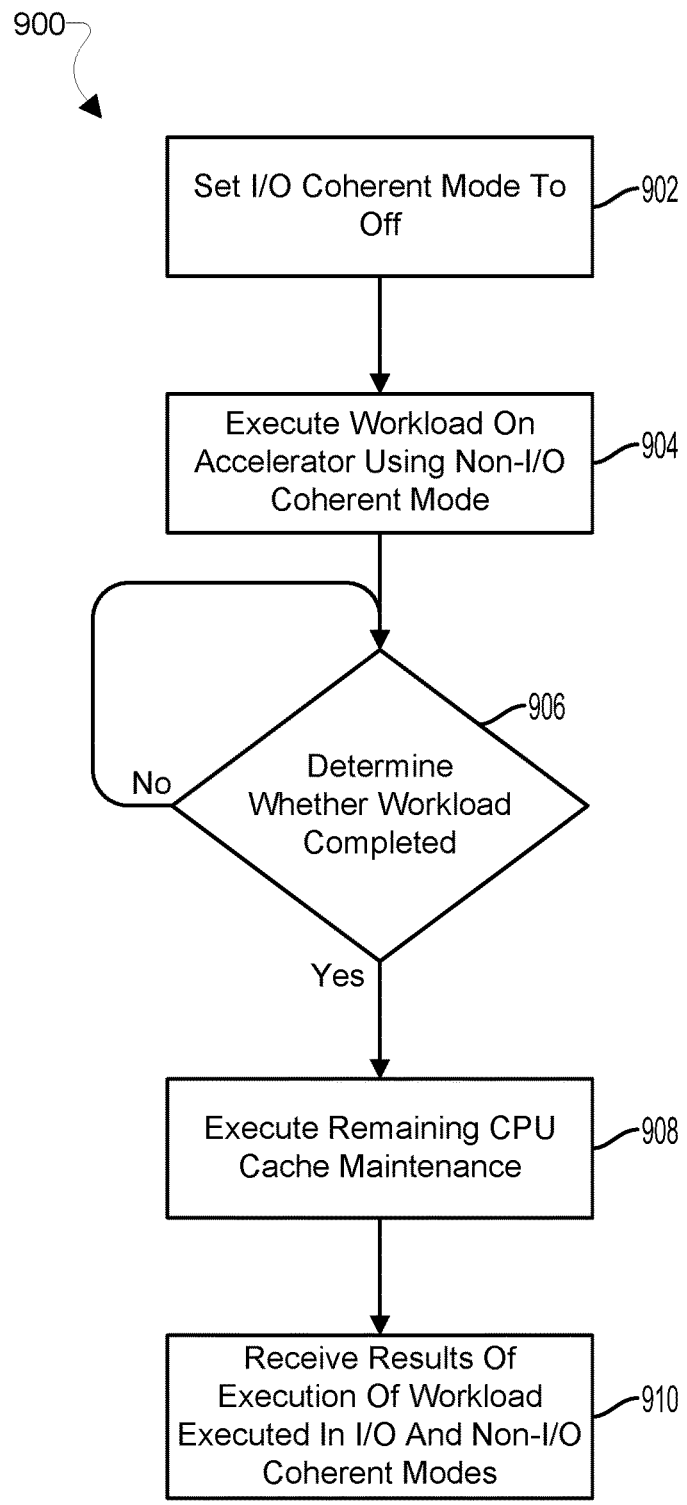
FIG. 9 is a process flow diagram illustrating a method for implementing dynamic I/O coherent workload processing according to an aspect.

FIG. 9 illustrates a method 900 for implementing dynamic I/O coherent workload processing according to an aspect. The method 900 may be implemented in a computing device in software executing in a processor (e.g., the processor 14 in FIGS. 1 and 2 and processing device 302 in FIGS. 3-7), in general purpose hardware, in dedicated hardware, or in a combination of a software-configured processor and dedicated hardware, such as a processor executing software within a dynamic I/O coherency system (e.g., FIG. 3) that includes other individual components. In order to encompass the alternative configurations enabled in the various aspects, the hardware implementing the method 900 is referred to herein as a "processing device." In various aspects, the method 900 may further describe the blocks 814 and 816 of the method 800.

In block 902, the processing device may set an I/O coherent mode to "off" for a processing device cache (e.g., processing device cache 308 in FIG. 3) and/or a shared memory (e.g., shared memory 304 in FIG. 3). Alternatively, the processing device may set a non-I/O coherent mode to "on" for the processing device cache and/or the shared memory.

In block 904, the hardware accelerator may execute the remaining offloaded workload while the processing device cache and/or the shared memory are in a non-I/O coherent mode.

In determination block 906, the processing device may determine whether the remaining offloaded workload is completed by the hardware accelerator.

In response to determining that the offloaded workload is not completed by the hardware accelerator (i.e., determination block 906="No"), the processing device may continuously determine whether the remaining offloaded workload is completed by the hardware accelerator in determination block 906. While the offloaded workload is not completed by the hardware accelerator, the hardware accelerator may continue to execute the remaining offloaded workload in block 904. During the execution of the remaining offloaded workload by the hardware accelerator, because the processing device cache and/or the shared memory has been switched to a non-I/O coherent mode, the remaining workload may no longer incur overhead due to the coherency mechanisms (e.g., coherency domain 314 in FIG. 3 and/or a snoop filter) of the coherent interconnect (i.e., coherent interconnect 312 in FIG. 3) implementing coherency operations for the data and memory access request transmitted between the processing device and the hardware accelerator.

In response to determining that the offloaded workload is completed by the hardware accelerator (i.e., determination block 906="Yes"), the processing device may execute any remaining cache maintenance operations for the non-I/O coherent mode in block 908. As discussed herein, to make the results of the execution of the offloaded workload available to the processing device, the processing device may implement a cache invalidate maintenance operation to direct future reads of the processing device cache space to a shared memory (e.g., shared memory 304 in FIG. 3) currently storing the results as a miss after the results are output by the hardware accelerator. The cache invalidate maintenance operation may also create overhead, which may vary depending on the amount of data of the offloaded workload results or the space used in the in the processing device cache to store the offloaded workload results. The overhead may delay the availability of the offloaded workload results for access, use, and/or output of the offloaded workload by the processing device.

In block 910, the processing device may receive the offloaded workload results. The processing device may receive and store the results of the execution of the offloaded workload in the processing device cache.

Figure 10:
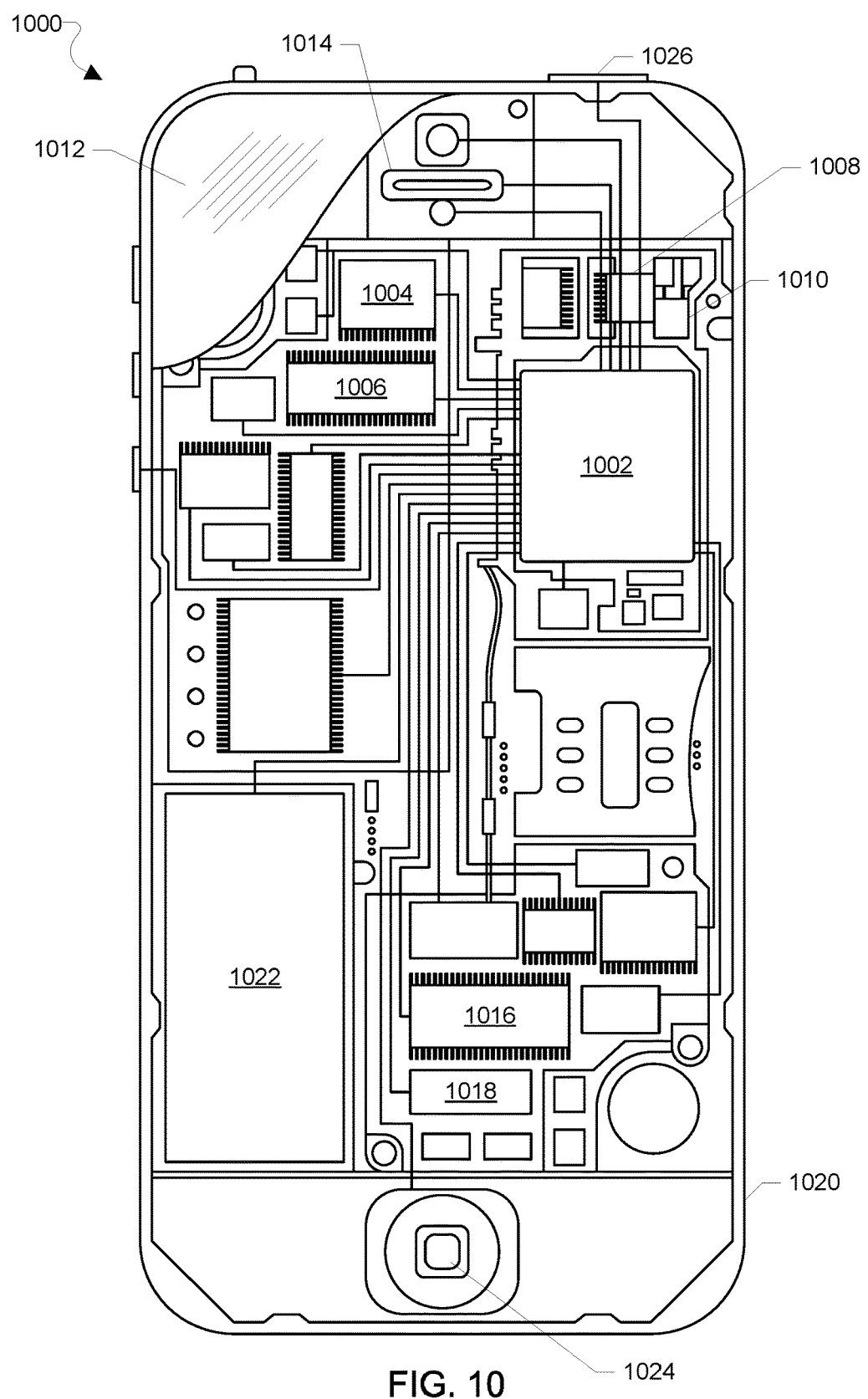
FIG. 10 is a component block diagram illustrating an example mobile computing device suitable for use with the various aspects.

The various aspects (including, but not limited to, aspects described above with reference to FIGS. 1-9) may be implemented in a wide variety of computing systems including mobile computing devices, an example of which suitable for use with the various aspects is illustrated in FIG. 10. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the computing device 1000 need not have touch screen capability.

The mobile computing device 1000 may have one or more radio signal transceivers 1008 (e.g., Peanut, Bluetooth, ZigBee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as Universal Serial Bus (USB), FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components described herein. The mobile computing device 1000 may include a power source 1022 coupled to the processor 1002, such as a disposable or rechargeable battery. The rechargeable battery may also be coupled to the peripheral device connection port to receive a charging current from a source external to the mobile computing device 1000. The mobile computing device 1000 may also include a physical button 1024 for receiving user inputs. The mobile computing device 1000 may also include a power button 1026 for turning the mobile computing device 1000 on and off.

Figure 11:
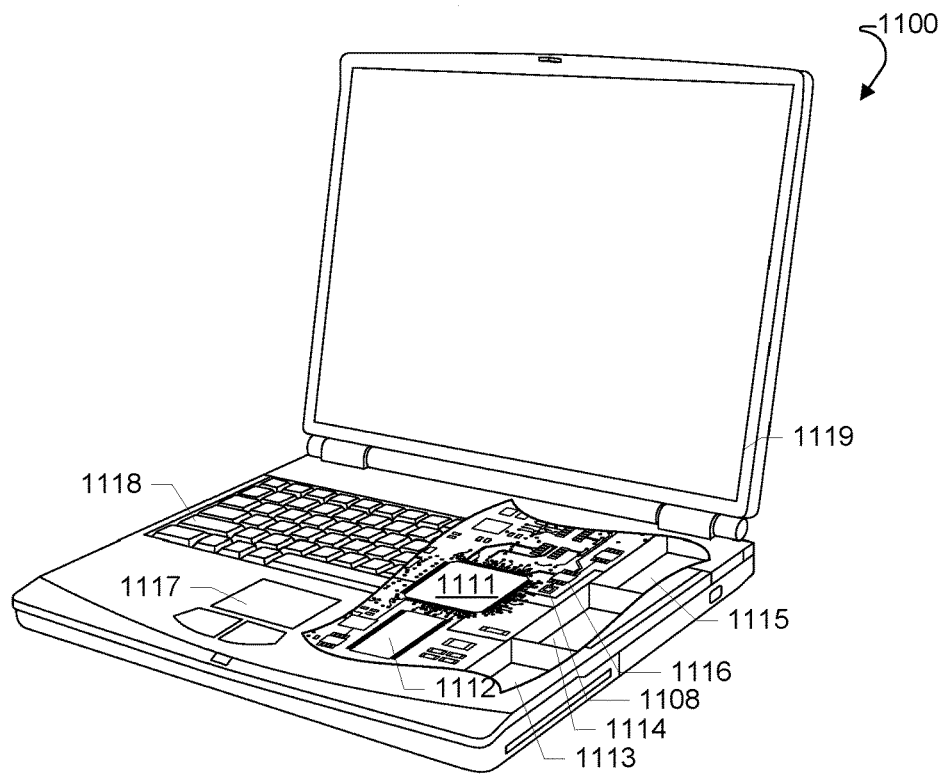
FIG. 11 is a component block diagram illustrating an example mobile computing device suitable for use with the various aspects.

The various aspects (including, but not limited to, aspects described above with reference to FIGS. 1-9) may be implemented in a wide variety of computing systems include a laptop computer 1100 an example of which is illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the computing device may include a computer mouse or trackball coupled to the processor (e.g., via a USB input) as are well known, which may also be used in conjunction with the various aspects.

Figure 12:
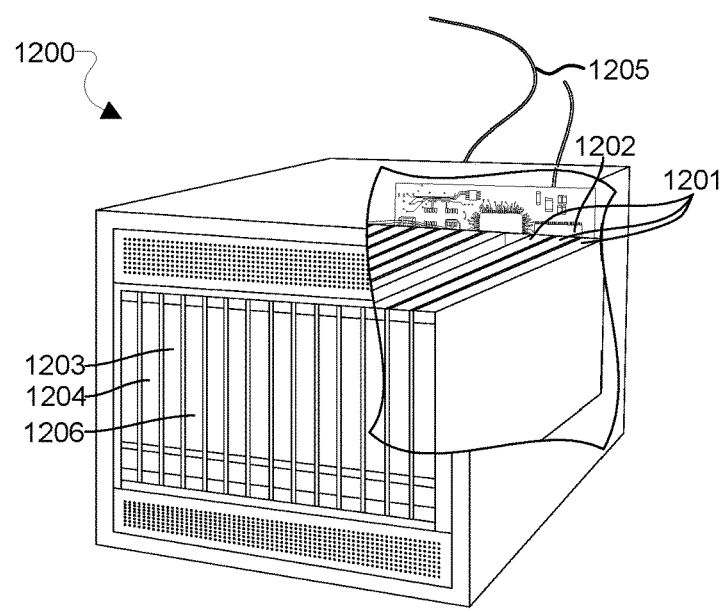
FIG. 12 is a component block diagram illustrating an example server suitable for use with the various aspects.

The various aspects (including, but not limited to, aspects described above with reference to FIGS. 1-9) may also be implemented in fixed computing systems, such as any of a variety of commercially available servers. An example server 1200 is illustrated in FIG. 12. Such a server 1200 typically includes one or more multicore processor assemblies 1201 coupled to volatile memory 1202 and a large capacity nonvolatile memory, such as a disk drive 1204. As illustrated in FIG. 12, multicore processor assemblies 1201 may be added to the server 1200 by inserting them into the racks of the assembly. The server 1200 may also include a floppy disc drive, compact disc (CD) or digital versatile disc (DVD) disc drive 1206 coupled to the processor 1201. The server 1200 may also include network access ports 1203 coupled to the multicore processor assemblies 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of implementing dynamic input/output (I/O) coherent workload processing on a computing device, comprising:
    offloading, by a processing device, a workload to a hardware accelerator for execution using an I/O coherent mode;
    detecting, by the processing device, a dynamic trigger for switching from the I/O coherent mode to a non-I/O coherent mode while the workload is executed by the hardware accelerator;
    executing a cache flush maintenance operation for a cache of the processing device in parallel with execution of the workload by the hardware accelerator in response to detecting the dynamic trigger for switching from the I/O coherent mode to the non-I/O coherent mode; and
    switching from the I/O coherent mode to the non-I/O coherent mode while the workload is executed by the hardware accelerator in response to completion of the cache flush maintenance operation.

2. The method of claim 1, further comprising determining whether execution of the workload by the hardware accelerator is completed, wherein detecting a dynamic trigger for switching from the I/O coherent mode to a non-I/O coherent mode while the workload is executed by the hardware accelerator comprises detecting the dynamic trigger for switching from the I/O coherent mode to the non-I/O coherent mode in response to determining that execution of the workload by the hardware accelerator is not completed.

3. The method of claim 1, further comprising:
    receiving, from the hardware accelerator, a result of the offloaded workload by a shared memory in the I/O coherent mode;
    determining whether execution of the workload by the hardware accelerator is completed; and
    receiving, by the processing device, the result of the offloaded workload without implementing a cache invalidate maintenance operation for the cache of the processing device in response to determining that execution of the workload by the hardware accelerator is completed.

4. The method of claim 1, further comprising:
determining whether execution of the workload by the hardware accelerator is completed, wherein switching from the I/O coherent mode to a non-I/O coherent mode while the workload is executed by the hardware accelerator comprises switching from the I/O coherent mode to the non-I/O coherent mode in response to determining that execution of the workload by the hardware accelerator is not completed;
receiving, from the hardware accelerator, a result of the offloaded workload by a shared memory in the non-I/O coherent mode;
executing a cache invalidate maintenance operation for a cache of the processing device in response to determining that execution of the workload by the hardware accelerator is completed; and
receiving, by the processing device, the result of the offloaded workload.

5. The method of claim 4, further comprising executing a remaining portion of the offloaded workload by the hardware accelerator in response to determining that execution of the workload by the hardware accelerator is not completed.

6. The method of claim 1, wherein detecting the dynamic trigger for switching from the I/O coherent mode to the non-I/O coherent mode comprises at least one of detecting an elapsed time, detecting the processing device in an idle state, or detecting suffering of execution of the offloaded workload.

7. The method of claim 6, wherein detecting suffering of the execution of the offloaded workload comprises at least one of receiving a notification of a driver of performance from an augmented workload, using static assignment or method based on workload classification, polling hardware performance registers for data that indicates suffering, measuring interconnect operating levels near maximum, measuring accelerator memory latency, measuring accelerator memory backpressure, or detecting a hardware accelerator idle state.

8. A computing device, comprising:
a shared memory;
a hardware accelerator; and
a processor device coupled to the shared memory and the hardware accelerator, and configured with processor-executable software instructions to:
offload a workload to the hardware accelerator for execution using an I/O coherent mode;
detect a dynamic trigger for switching from the I/O coherent mode to a non-I/O coherent mode while the workload is executed by the hardware accelerator;
execute a cache flush maintenance operation for a cache of the processing device in parallel with execution of the workload by the hardware accelerator in response to detecting the dynamic trigger for switching from the I/O coherent mode to the non-I/O coherent mode; and
switch from the I/O coherent mode to the non-I/O coherent mode while the workload is executed by the hardware accelerator in response to detecting the dynamic completion of the cache flush maintenance operation.

9. The computing device of claim 8, wherein the processing device is further configured with processor-executable software instructions to determine whether execution of the workload by the hardware accelerator is completed,
wherein the processing device is configured with processor-executable software instructions to detect a dynamic trigger for switching from the I/O coherent mode to a non-I/O coherent mode while the workload is executed by the hardware accelerator by detecting the dynamic trigger for switching from the I/O coherent mode to the non-I/O coherent mode in response to determining that execution of the workload by the hardware accelerator is not completed.

10. The computing device of claim 8, wherein the processing device is further configured with processor-executable software instructions to:
receive, from the hardware accelerator, a result of the offloaded workload by the shared memory in the I/O coherent mode;
determine whether execution of the workload by the hardware accelerator is completed; and
receive the result of the offloaded workload without implementing a cache invalidate maintenance operation for the cache of the processing device in response to determining that execution of the workload by the hardware accelerator is completed.

11. The computing device of claim 8, wherein the processing device is further configured with processor-executable software instructions to:
determine whether execution of the workload by the hardware accelerator is completed, wherein switching from the I/O coherent mode to a non-I/O coherent mode while the workload is executed by the hardware accelerator comprises switching from the I/O coherent mode to the non-I/O coherent mode in response to determining that execution of the workload by the hardware accelerator is not completed;
receive, from the hardware accelerator, a result of the offloaded workload by the shared memory in the non-I/O coherent mode;
execute a cache invalidate maintenance operation for a cache of the processing device in response to determining that execution of the workload by the hardware accelerator is completed; and
receive the result of the offloaded workload.

12. The computing device of claim 8, wherein the processing device is further configured with processor-executable software instructions to detect the dynamic trigger for switching from the I/O coherent mode to the non-I/O coherent mode by at least one of detecting an elapsed time, detecting the processing device in an idle state, or detecting suffering of execution of the offloaded workload.

13. The computing device of claim 12, wherein the processing device is further configured with processor-executable software instructions to detect suffering of the execution of the offloaded workload by at least one of receiving a notification of a driver of performance from an augmented workload, using static assignment or method based on workload classification, polling hardware performance registers for data that indicates suffering, measuring interconnect operating levels near maximum, measuring accelerator memory latency, measuring accelerator memory backpressure, or detecting a hardware accelerator idle state.

14. A computing device, comprising:
a hardware accelerator;
means for offloading a workload to the hardware accelerator for execution using an I/O coherent mode;

means for detecting a dynamic trigger for switching from the I/O coherent mode to a non-I/O coherent mode while the workload is executed by the hardware accelerator;

means for executing a cache flush maintenance operation for a cache in parallel with execution of the workload by the hardware accelerator in response to detecting the dynamic trigger for switching from the I/O coherent mode to the non-I/O coherent mode; and means for switching from the I/O coherent mode to the non-I/O coherent mode while the workload is executed by the hardware accelerator in response to detecting the dynamic trigger completion of the cache flush maintenance operation.

15. The computing device of claim 14, further comprising means for determining whether execution of the workload by the hardware accelerator is completed, wherein means for detecting a dynamic trigger for switching from the I/O coherent mode to a non-I/O coherent mode while the workload is executed by the hardware accelerator comprises means for detecting the dynamic trigger for switching from the I/O coherent mode to the non-I/O coherent mode in response to determining that execution of the workload by the hardware accelerator is not completed.

16. The computing device of claim 14, further comprising:

means for receiving, from the hardware accelerator, a result of the offloaded workload by a shared memory in the I/O coherent mode;

means for determining whether execution of the workload by the hardware accelerator is completed; and means for receiving the result of the offloaded workload without implementing a cache invalidate maintenance operation for the cache in response to determining that execution of the workload by the hardware accelerator is completed.

17. The computing device of claim 14, further comprising:

means for determining whether execution of the workload by the hardware accelerator is completed, wherein switching from the I/O coherent mode to a non-I/O coherent mode while the workload is executed by the hardware accelerator comprises switching from the I/O coherent mode to the non-I/O coherent mode in response to determining that execution of the workload by the hardware accelerator is not completed;

means for receiving, from the hardware accelerator, a result of the offloaded workload by a shared memory in the non-I/O coherent mode;

means for executing a cache invalidate maintenance operation for a cache in response to determining that execution of the workload by the hardware accelerator is completed; and means for receiving the result of the offloaded workload.

18. The computing device of claim 17, further comprising means for executing a remaining portion of the offloaded workload by the hardware accelerator in response to determining that execution of the workload by the hardware accelerator is not completed.

19. The computing device of claim 14, wherein means for detecting the dynamic trigger for switching from the I/O coherent mode to the non-I/O coherent mode comprises at least one of means for detecting an elapsed time, means for detecting that a processing device is in an idle state, or means for detecting suffering of execution of the offloaded workload.

20. The computing device of claim 19, wherein means for detecting suffering of execution of the offloaded workload comprises at least one of means for receiving a notification of a driver of performance from an augmented workload, means for using static assignment or method based on workload classification, means for polling hardware performance registers for data that indicates suffering, means for measuring interconnect operating levels near maximum, means for measuring accelerator memory latency, means for measuring accelerator memory backpressure, or means for detecting a hardware accelerator idle state.

21. A non-transitory processor-readable medium having stored thereon processor-executable instructions configured to cause a processing device of a computing device to perform operations comprising:

offloading a workload to a hardware accelerator for execution using an I/O coherent mode;

detecting a dynamic trigger for switching from the I/O coherent mode to a non-I/O coherent mode while the workload is executed by the hardware accelerator;

executing a cache flush maintenance operation for a cache of the processing device in parallel with execution of the workload by the hardware accelerator in response to detecting the dynamic trigger for switching from the I/O coherent mode to the non-I/O coherent mode; and switching from the I/O coherent mode to the non-I/O coherent mode while the workload is executed by the hardware accelerator in response to completion of the cache flush maintenance operation.

22. The non-transitory processor-readable medium of claim 21, wherein the stored executable instructions are configured to cause the processing device of the computing device to perform operations further comprising determining whether execution of the workload by the hardware accelerator is completed, wherein the stored executable instructions are configured to cause the processing device of the computing device to perform operations such that detecting a dynamic trigger for switching from the I/O coherent mode to a non-I/O coherent mode while the workload is executed by the hardware accelerator comprises detecting the dynamic trigger for switching from the I/O coherent mode to the non-I/O coherent mode in response to determining that execution of the workload by the hardware accelerator is not completed.

23. The non-transitory processor-readable medium of claim 21, wherein the stored executable instructions are configured to cause the processing device of the computing device to perform operations further comprising:

receiving, from the hardware accelerator, a result of the offloaded workload by a shared memory in the I/O coherent mode;

determining whether execution of the workload by the hardware accelerator is completed; and receiving the result of the offloaded workload without implementing a cache invalidate maintenance operation for the cache of the processing device in response to determining that execution of the workload by the hardware accelerator is completed.

24. The non-transitory processor-readable medium of claim 21, wherein the stored executable instructions are configured to cause the processing device of the computing device to perform operations further comprising:

determining whether execution of the workload by the hardware accelerator is completed, wherein switching from the I/O coherent mode to a non-I/O coherent mode while the workload is executed by the hardware accelerator comprises switching from the I/O coherent mode to the non-I/O coherent mode in response to determining that execution of the workload by the hardware accelerator is not completed;

receiving, from the hardware accelerator, a result of the offloaded workload by a shared memory in the non-I/O coherent mode;

executing a cache invalidate maintenance operation for a cache of the processing device in response to determining that execution of the workload by the hardware accelerator is completed; and receiving the result of the offloaded workload.

25. The non-transitory processor-readable medium of claim 21, wherein the stored executable instructions are configured to cause the processing device of the computing device to perform operations such that detecting the dynamic trigger for switching from the I/O coherent mode to the non-I/O coherent mode comprises at least one of detecting an elapsed time, detecting the processing device in an idle state, or detecting suffering of execution of the offloaded workload.

26. The non-transitory processor-readable medium of claim 25, wherein the stored executable instructions are configured to cause the processing device of the computing device to perform operations such that detecting suffering of the execution of the offloaded workload comprises at least one of receiving a notification of a driver of performance from an augmented workload, using static assignment or method based on workload classification, polling hardware performance registers for data that indicates suffering, measuring interconnect operating levels near maximum, measuring accelerator memory latency, measuring accelerator memory backpressure, or detecting a hardware accelerator idle state.

* * * * *